(12) United States Patent
Gauger, Jr. et al.

(10) Patent No.: US 10,192,537 B2
(45) Date of Patent: *Jan. 29, 2019

(54) VOICE SENSING USING MULTIPLE MICROPHONES

(71) Applicant: Bose Corporation, Framingham, MA (US)

(72) Inventors: Daniel M. Gauger, Jr., Berlin, MA (US); Jahn Dmitri Eichfeld, Natick, MA (US); Steven H. Isabelle, Newton, MA (US); John Allen Rule, Berlin, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/713,173

(22) Filed: Sep. 22, 2017

(65) Prior Publication Data

US 2018/0012584 A1    Jan. 11, 2018

Related U.S. Application Data

(63) Continuation of application No. 14/657,604, filed on Mar. 13, 2015.

(51) Int. Cl.
*G10K 11/175* (2006.01)
*H04R 1/10* (2006.01)
(Continued)

(52) U.S. Cl.
CPC ......... *G10K 11/175* (2013.01); *H04M 1/6058* (2013.01); *H04R 1/10* (2013.01);
(Continued)

(58) Field of Classification Search
CPC .. G10K 11/175; H04M 1/585; H04M 1/6058; H04R 1/10; H04R 1/1016; H04R 1/1083;
(Continued)

(56) References Cited

U.S. PATENT DOCUMENTS

H000417 H  *  1/1988  Miles ........................ 381/71.13
2014/0307884 A1* 10/2014  Asada ................. G10K 11/178
381/71.6

FOREIGN PATENT DOCUMENTS

JP    2012129970 A    7/2012
JP    2013121105 A    6/2013
(Continued)

OTHER PUBLICATIONS

First Japanese Office Action dated Nov. 5, 2018 for Japanese Application No. 2017-548137.

*Primary Examiner* — Vivian Chin
*Assistant Examiner* — Friedrich W Fahnert

(57) ABSTRACT

A noise cancelling headset includes first and second earpieces, each earpiece including a respective feedback microphone, a respective feed-forward microphone, and a respective output driver. A first feedback filter receives an input from at least the first feedback microphone and produces a first filtered feedback signal. A first feed-forward filter receives an input from at least the first feed-forward microphone and produces a first filtered feed-forward signal. A first summer combines the first filtered feedback signal and the first filtered feed-forward signal and produces a first output signal. An output interface provides the first output signal as an output from the headset.

8 Claims, 11 Drawing Sheets

(51) Int. Cl.
*H04M 1/60* (2006.01)
*H04R 3/00* (2006.01)
*H04M 1/58* (2006.01)

(52) U.S. Cl.
CPC ........... *H04R 1/1083* (2013.01); *H04R 3/005* (2013.01); *H04M 1/585* (2013.01); *H04R 1/1016* (2013.01); *H04R 2201/107* (2013.01); *H04R 2460/01* (2013.01); *H04R 2460/05* (2013.01)

(58) Field of Classification Search
CPC .......... H04R 2201/107; H04R 2460/01; H04R 2460/05; H04R 3/005
USPC ......... 381/57, 71.1, 71.6, 71.9, 71.12, 71.11, 381/71.7, 71.8, 74, 94.1, 94.3, 95, 102, 381/108, 122
See application file for complete search history.

(56) References Cited

FOREIGN PATENT DOCUMENTS

| JP | 2013121106 A | 6/2013 |
|---|---|---|
| WO | 2014071013 A1 | 5/2014 |

* cited by examiner

VOICE SENSING USING MULTIPLE MICROPHONES

This application is a continuation of, and claims priority to, application Ser. No. 14/657,604, filed Mar. 13, 2015, now U.S. Pat. No. 9,905,216, titled Voice Sensing using Multiple Microphones.

BACKGROUND

U.S. Pat. No. 8,682,001, by Annunziato et al., incorporated here by reference, describes an in-ear active noise reduction (ANR) headset that includes two microphones in each earbud, one inside the acoustic system for providing feedback-based ANR, and one outside the acoustic system for providing feed-forward-based ANR. In a commercial product embodying that patent application, the Bose® QC® 20 Acoustic Noise Cancelling® headphones, a fifth microphone was provided, in the cable joint housing of the headphone cable, for picking up the user's voice for use in communications applications. Other in-ear headphone products tend to also include communications microphones somewhere in the headphone cable, rather than in the earbud, as do many on-ear and around-ear headphones.

Detecting the voice of a user of headphones is useful for at least two reasons. First, it provides near-end audio for transmitting to a communication partner. Second, headphones, and in particular ANR headphones, tend to distort how the user hears his own voice when speaking, which we refer to as self-voice. Playing back the user's own voice within the headphones, which we refer to as side-tone audio, allows the user to hear his voice, and properly modulate it for conversation either with an electronic communication partner or face-to-face. Providing an accurate side-tone requires good voice detection.

SUMMARY

In order to enable telephony or radio communication in noisy environments where ANR headsets are worn, a microphone that has good noise rejection is needed. The microphone noise rejection should be sufficient to enable sufficiently-high SNR for communication partners to provide intelligibility and comfort, and provide natural self-voice to the user via side-tone without introducing significantly more environmental noise than is present without side-tone. The standard solution for this is to use a dipole or other gradient microphone on a boom, positioned as close to the lips as practical. However, in the case of comfortable-to-wear in-ear headsets, suspending such a boom is a challenge. The invention provides good voice pick-up without requiring a boom. Examples of applications include headsets for use in airplanes, mobile telephony in large raucous groups, industrial communication headsets and tactical headsets for military use. In these applications, the voice need not sound completely natural as complete fidelity is not expected.

In general, in one aspect, an in-ear noise cancelling headset includes first and second earpieces, each earpiece including a respective feedback microphone, a respective feed-forward microphone, and a respective output driver. A first feedback filter receives an input from at least the first feedback microphone and produces a first filtered feedback signal. A first feed-forward filter receives an input from at least the first feed-forward microphone and produces a first filtered feed-forward signal. A first summer combines the first filtered feedback signal and the first filtered feed-forward signal and produces a first output signal. An output interface provides the first output signal as an output from the headset.

Implementations may include one or more of the following, in any combination. A second feedback filter may receive an input from the second feedback microphone and produce a second filtered feedback signal; the first summer combines the first filtered feedback signal with the second filtered feedback signal. A second feed-forward filter may receives an input from the second feed-forward microphone and produce a second filtered feed-forward signal; the first summer combines the first filtered feed-forward signal with the second filtered feed-forward signal. A second summer may combine the first and second feedback microphone inputs and provide a summed feedback microphone signal to the first feedback filter. A second summer may combine the first and second feed-forward microphone inputs and provide a summed feed-forward microphone signal to the first feed-forward filter. A second feedback filter may receive an input from the second feedback microphone and produce a second filtered feedback signal, while a second feed-forward filter receives an input from the second feed-forward microphone and produces a second filtered feed-forward signal; a second summer combines the second filtered feedback signal with the second filtered feed-forward signal to produce a second output signal.

At least the first earpiece may include an additional external microphone, and the first feed-forward filter may include a feed-forward array processing filter receiving inputs from the first or second feed-forward microphone and the additional external microphone, producing an array-filtered signal; the first summer combines the array filtered signal with at least the first feedback filtered signal to produce the output signal. A joint housing may be connected to cords leading from the earpieces, the joint housing including an array of microphones, and an array processing filter may receive inputs from the array of microphones and the first and second feed-forward microphones, producing an array-filtered signal; the first summer combines the array filtered signal with at least the first feedback filtered signal to produce the output signal.

A second summer may combine the first and second feedback microphone inputs and provide a summed feedback microphone signal to a comparator, while a third summer combines the first and second feed-forward microphone inputs and provides a summed feed-forward microphone signal to the comparator, with an output of the comparator controlling operation of the first feedback filter and the first feed-forward filter based on a comparison of the summed feedback microphone signal with the summed feed-forward microphone signal. The output of the comparator may deactivate the first feedback filter when the comparison indicates that the summed feedback microphone signals have less signal content than the summed feed-forward microphone signals above 500 Hz. The output of the comparator may deactivate the first feed-forward filter when the comparison indicates that the summed feedback microphone signals have more signal content than the summed feed-forward microphone signals between 150 Hz and 500 Hz.

In general, in one aspect, an in-ear noise cancelling headset includes an earpiece including a feedback microphone and an output driver. A feedback loop receives a first signal from the feedback microphone and provides an anti-noise signal, based on the first signal, to the output driver. The feedback loop includes a feedback compensation filter that receives the first signal and produces the antinoise signal. At frequencies at which voice sounds produced by the wearer of the headset tend to be amplified within an occluded ear canal, the feedback compensation filter produces antinoise at levels selected to counteract such amplification without otherwise cancelling the voice sounds. An output interface provides at least the first signal as a voice communication signal output from the headset.

Implementations may include one or more of the following, in any combination. A feed-forward microphone may be coupled to space outside the earpiece, a feed-forward loop receiving a second signal from the feed-forward microphone and providing a second antinoise signal based on the second signal to the output driver, via a feed-forward compensation filter, with a voice circuit receiving the first signal and the second signal, applying a filter to the second signal, and combining the filtered second signal with the first signal to generate the voice communication signal. A feed-forward microphone may be coupled to space outside the earpiece, a voice microphone, separate from the feed-forward microphone, may also be coupled to space outside the earpiece, with a feed-forward loop receiving a second signal from the feed-forward microphone and providing a second antinoise signal based on the second signal to the output driver, via a feed-forward compensation filter, while a voice circuit receives the first signal and a third signal from the voice microphone, applies a filter to the third signal, and combines the filtered third signal with the first signal to generate the voice communication signal. First and second feed-forward microphone may be coupled to space outside the earpiece, with a feed-forward loop receiving a sum of a second signal from the first feed-forward microphone and a third signal from the second feed-forward microphone, and providing a second antinoise signal based on the sum to the output driver, via a feed-forward compensation filter, while and a voice circuit receives a difference of the second signal and the third signal, applies a filter to the difference, and combines the filtered difference signal with the first signal to generate the voice communication signal.

Advantages include detecting the user's voice and providing it to the same user or to communication partners in a clear and intelligible manner, without the use of an additional voice microphone, and with better intelligibility than prior solutions using dedicated voice microphones.

All examples and features mentioned above can be combined in any technically possible way. Other features and advantages will be apparent from the description and the claims.

DESCRIPTION

Figure 1B:
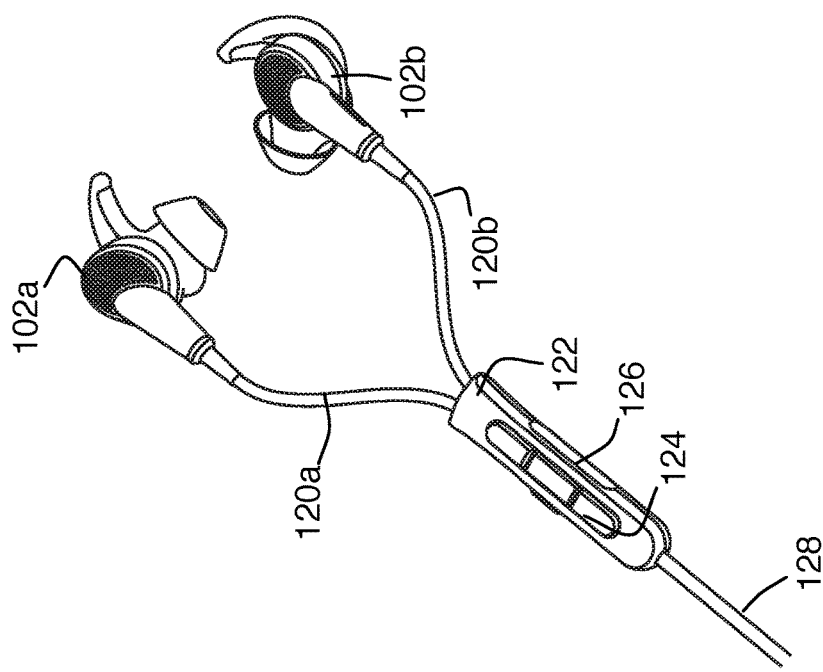
FIG. 1B shows a perspective external view of a set of in-ear active noise reducing headphones.
Figure 1A:
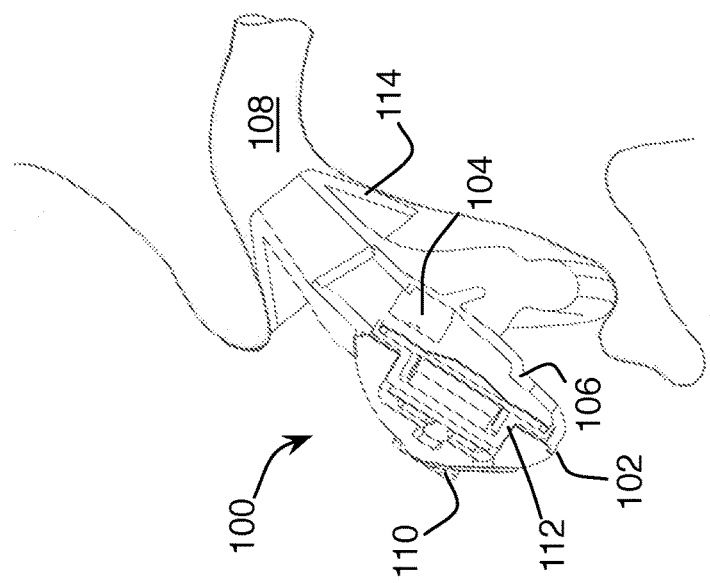
FIG. 1A shows a cross-sectional view of an in-ear active noise reducing headphone and a portion of the head of a wearer.

As shown in FIG. 1A, an active noise reduction (ANR) headphone 100 includes two microphones mounted to each earbud 102. A feedback microphone 104 is located inside the acoustic structure 106 of the earbud 102, and detects sound pressure inside the acoustic structure, which is very similar to the sound pressure inside the user's ear canal 108, i.e., the sound the user hears. A feed-forward microphone 110 is located outside the acoustic structure of the earbud, and detects sound pressure reaching the ear before it passes through the mechanical structures of the earbud. The feed-forward microphone is used in a feed-forward noise cancellation path to provide a filtered noise cancellation signal to an output transducer 112. The signals output by the transducer 112 cancel sound that enters the ear canal. The feedback microphone is used in a feedback loop to detect and cancel sound within the ear canal that is still present after the feed-forward cancellation, including sounds entering the ear canal from inside the head, rather than through the air path from outside. In some examples, only one of the feed-forward or feedback cancellation path is provided.

In a typical commercial implementation, such as that shown in FIG. 1B, two matching earbuds 102a and 102b are provided, each having respective feedback and feed-forward microphones and output transducers contained within them. The two earbuds are connected via cords 120a and 120b to a module 122. The module 122 may provide buttons 124 for controlling the headphones, and an additional microphone 126 for use in making phone calls or other voice interactions with connected devices. In some cases, the microphone 126 is of a different type from the microphones 104 and 110 used to provide ANR in the earbuds, owing to the different performance requirements of voice communication and noise reduction. In the example of FIG. 1B, the module 122 also serves as the joint housing of the headphones, with a single cord 128 exiting to connect to external devices, such as signal processing circuitry or audio source circuitry (not shown). In other examples, the module 122 with buttons and microphone may be separate from the joint housing, often located along one of the two cords 120a or 120b, or farther down the single cord 128. In some examples, all of the processing circuitry is contained within the earbuds or in the module 122, including a wireless interface for external communication, and the cord 128 to external devices is omitted, eliminating the primary reason to have the joint housing. An on-ear or around-ear headphone will have the same components, but generally arranged more spaciously, as their earpieces have more room for the components, but may also provide less of a seal to the ear canal.

In many cases, neither the joint housing nor a position along one of the cords provides an ideal location for capturing a good quality voice signal. Reasons for this include the distance from the mouth, and the variability of that distance, the orientation of the speaker relative to the mouth, and the variability of that, and the possibility that the microphone may be blocked by clothing. In some examples, the cords are routed behind the head, and simply don't go any closer to the mouth than the earbuds themselves.

Figure 2:
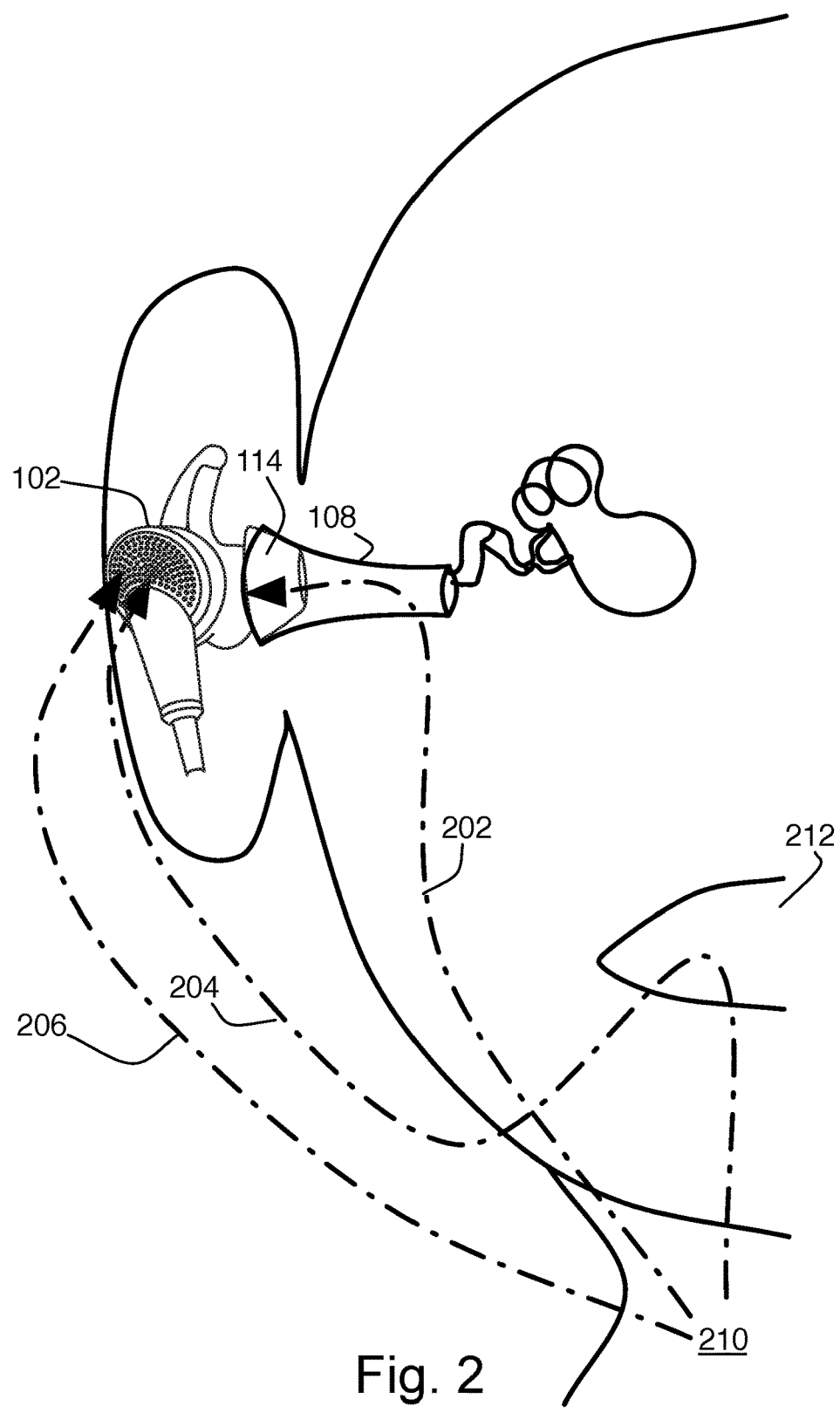
FIG. 2 shows a schematic view of the different paths sound takes to the ear when a person speaks.

Instead of using the microphone 126 in the module 122, the user's voice can be identified within the signals from the feedback and feed-forward microphones. Neither the feedback microphones nor the feed-forward microphones provide a high-quality voice communication signal on their own, but the separate microphone signals can be filtered and combined to create a single signal that accurately represents the user's voice When a person speaks, they hear their own voice both through the air and through their own head. Occluding earphones block higher frequency sounds from the user's mouth from reaching the user's ear through the air path, while causing a boost in low frequency sounds passing through the user's head due to the occlusion effect. As a result, different speech sounds couple differently from their site of production to the locations of the ANR microphones, as illustrated in FIG. 2. Voiced sounds (sounds produced by moving air through the larynx 210) couple well through the head to a feedback microphone inside the occluding earphone as shown by arrow 202. Fricatives (sounds produced by moving air past the lips and teeth, arrow 204), also called unvoiced sounds, and other sounds coming from the mouth 212 do not couple well to the feedback microphone.

The feed-forward microphones are exposed to both types of speech sounds through the air path, see arrows 204 and 206, but are not generally positioned well to detect such sounds with an adequate sensitivity to be useful as communication headphones on their own. The feed-forward microphones can be used, however, to fill in the gaps from the feedback microphones, allowing the reconstruction of a reasonably intelligible voice signal.

A set of feedback/feed-forward noise canceling headphones, such as the QuietComfort® 20 Acoustic Noise Canceling® headphones from Bose® Corporation, shown in FIGS. 1A, 1B, and 2, has a total of four microphones available, as described above. As shown in FIG. 2, these headphones have an ear tip 114 that is designed to just seal the entrance of the ear canal 108, as described in U.S. Pat. No. 8,737,669, by Monahan et al., incorporated here by reference. Sealing at the entrance of the ear canal, and not more deeply, has the effect of maximizing the level of body-conducted voice sounds 202 in the ear canal, where the feedback microphones can detect them via the front cavity of the earbud.

The feedback and feed-forward microphone signals can be combined in several ways to generate an improved voice signal.

Figure 3:
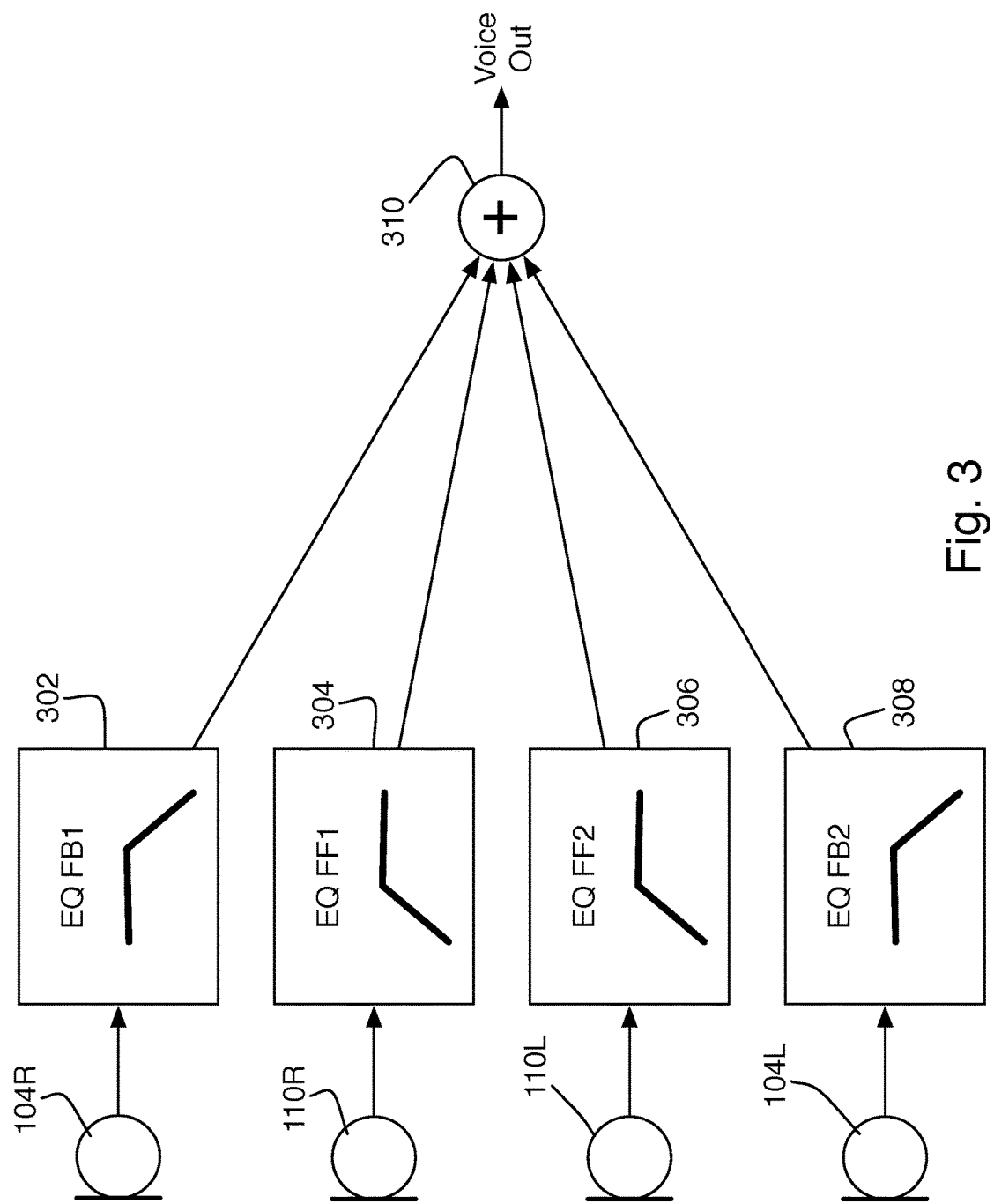
FIGS. 3 through 11 show block diagrams of signal flows in headphones.
Figure 4:
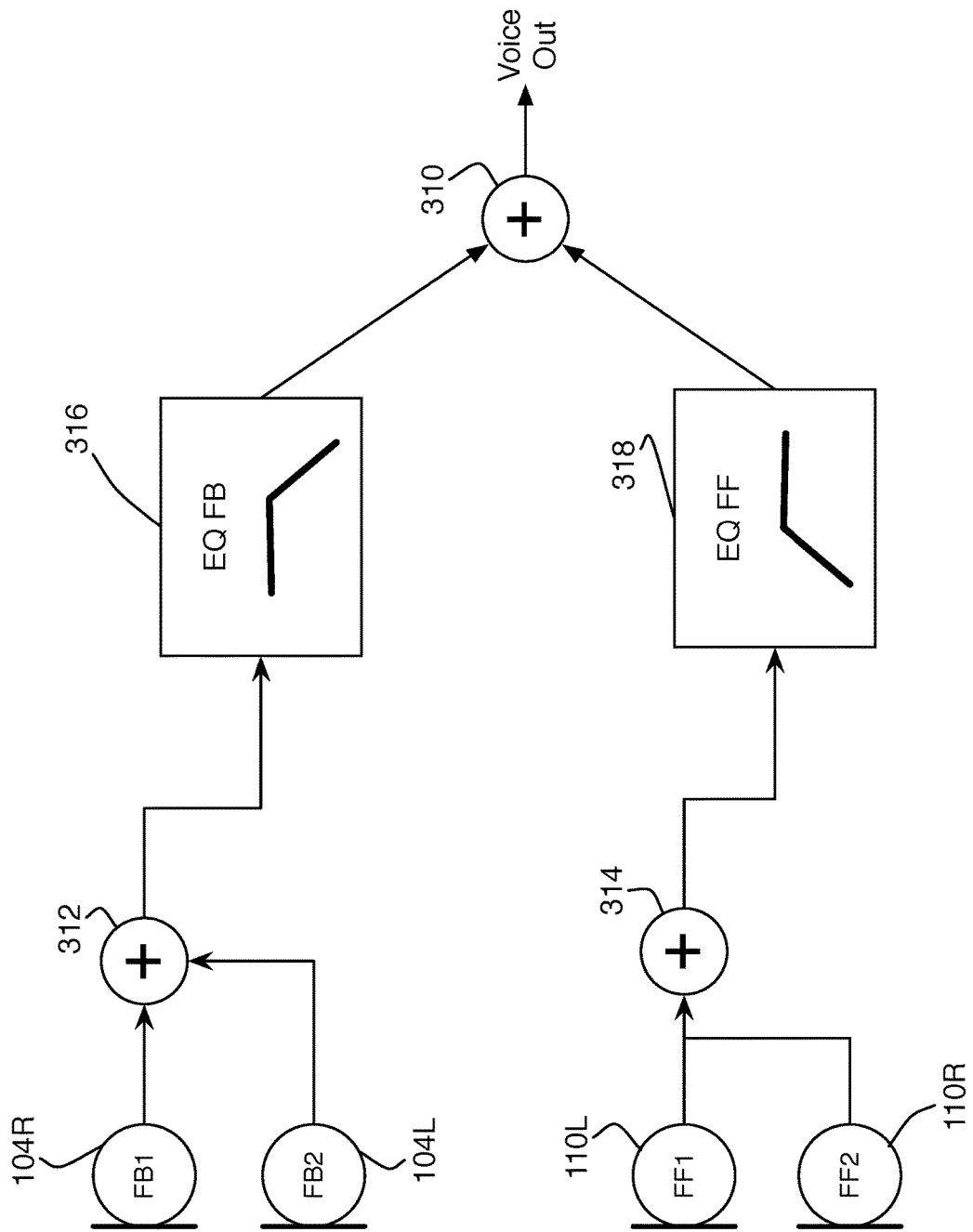

In one example, as shown in FIG. 3, the four microphone signals are each linearly equalized and then mixed together to generate the voice output signal. The voice output signal is then provided to additional processing elements, not shown, or output from the headset over a wired or wireless interface, not shown. A separate equalization 302, 304, 306, 308 may be applied to each of the four signals, and the equalized signals are summed 310. Other filters are used to implement feedback-based and feed-forward-based noise cancellation, not shown. In other examples, as shown in FIG. 4, the two feedback microphone signals and the two feed-forward signals may each be combined 312, 314 before equalizations 316, 318 are applied, on the assumption that the signals are essentially the same on both sides, while using the signals from both sides improves the signal-to-noise ratio by 3 dB. Equalizing the summed signals can save resources within the circuitry.

Figure 5:
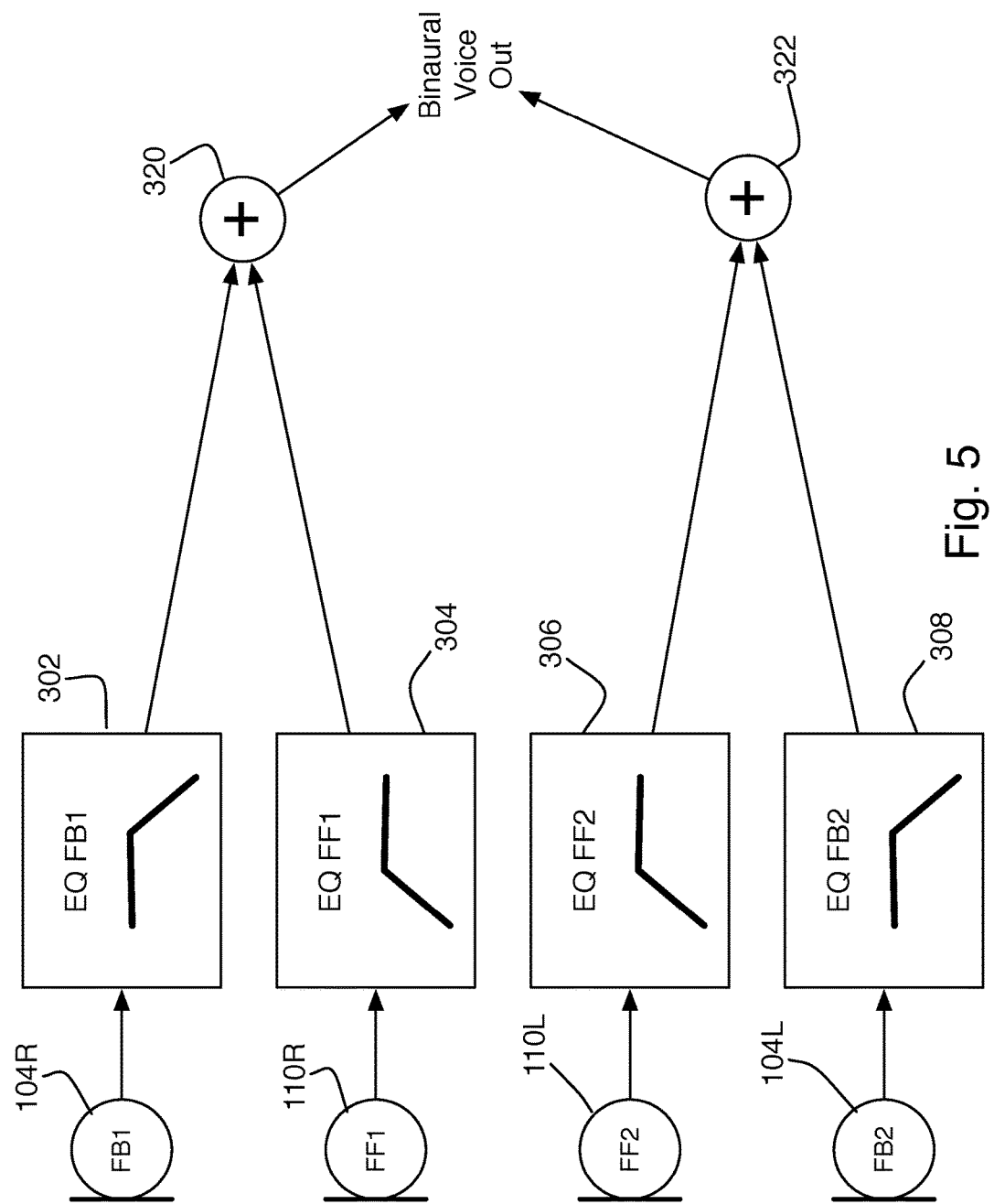

In some examples, the equalization 302, 308, or 316 for the feedback signals pass predominantly lower-frequency sounds, corresponding to body-conducted voiced sounds. The equalization 304, 306, or 318 for the feed-forward signals pass predominantly higher-frequency sounds, corresponding to the air-conducted unvoiced sounds missing from the body-conducted signals. In each case, the equalizations may simply apply gain shaping to the microphone signals, but they may also include delay or non-minimum phase terms to ensure that the signal paths mix to best effect, i.e., achieve the most natural voice, in order to compensate for different sound speeds through the head and through the air around the head. In another example, as shown in FIG. 5, the same topology for equalizations as in FIG. 3 is used, but the left and right sets of microphones are summed independently 320, 322, to produce a binaural voice signal. Equalization is given as the example here, but in practice, any appropriate filtering may be applied to each of the microphone signals. The summing can be uniform or weighted, or weighting may be combined with the filtering stages. The discrete elements shown in the figures are for illustration only, in practice, all of the processing may be handled in a single device, such as a digital signal processor.

If more signal processing capability is available, then more can be done than simply filtering and summing the signals. For example, in the topology of FIG. 3, four estimates of the speech signal may be generated, by, for example, applying noise suppression techniques well-known in the art to individual microphone signals and then combining the four estimates by averaging.

Figure 6:
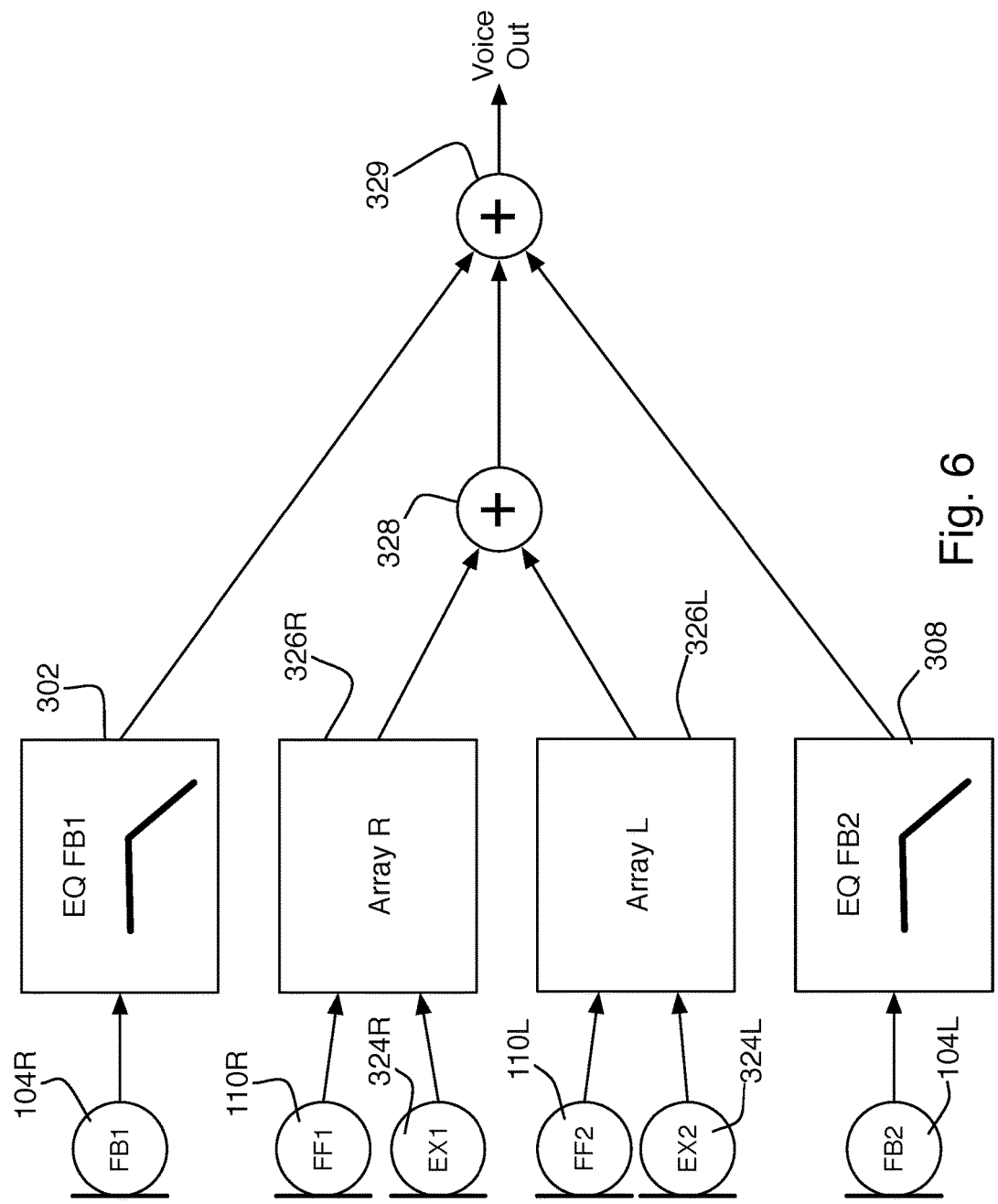

The signal provided by the feed-forward microphones 110R, 110L can be further improved as shown in FIG. 6 by adding additional external microphones 324R, 324L. The signals from the feed-forward and additional external microphones are combined in feed-forward array processing stages 326R, 326L to improve the signal to noise ratio (SNR, or equivalently, voice-to-noise ratio), thereby sensing the wearer's voice more strongly than ambient noise. Each pair of microphones provides an array, one on each side of the head, with a main lobe oriented towards the mouth. A first-order gradient reception pattern, such as a figure-eight pattern increases the voice-to-noise ratio due to the proximity effect. Providing an array on each side and adding those together (328) further increases the voice-to-noise ratio. The left and right feedback signals are then summed 329 with the feed forward array signal; alternatively, the summations 328 and 329 could be combined, or, as in FIG. 4, the feedback signals may be combined before being passed through a single filter and then combined with the array-processed signals.

Figure 7:
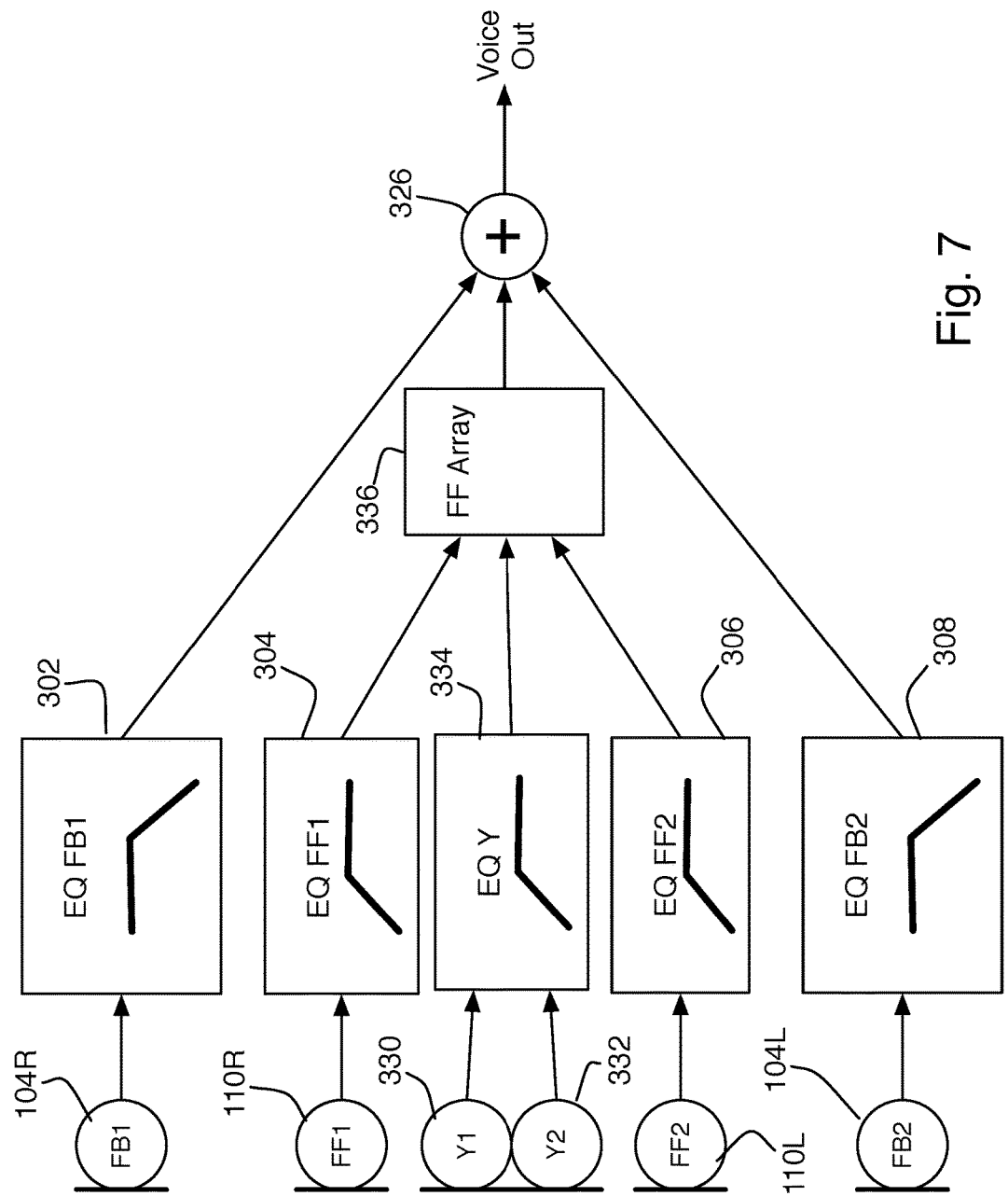

Another approach, the topology for which is shown in FIG. 7, is to place at least two microphones 330, 332, in the joint housing to create an end-fire array looking upward toward the wearer's mouth. The joint housing is typically suspended or clipped near the center of the wearer's chest. The main lobe of the array should accommodate the varying angle at which the joint housing might be clipped while still being largely sensitive to the wearer's voice. An advantage of this approach is that the array looks upward to sense the wearer's voice, whereas the noise sources to be rejected are typically horizontally located around the wearer (e.g., other people). The joint housing microphone signals are combined and equalized 334 to produce a single signal. The signal from the joint housing array processing is further combined with the earbud feed-forward microphone signals (which may themselves be array signals, as in FIG. 6) for array processing 336. This can further improve the SNR sensing of the air-conducted voice before combining it with the body-conducted signal.

Figure 8:
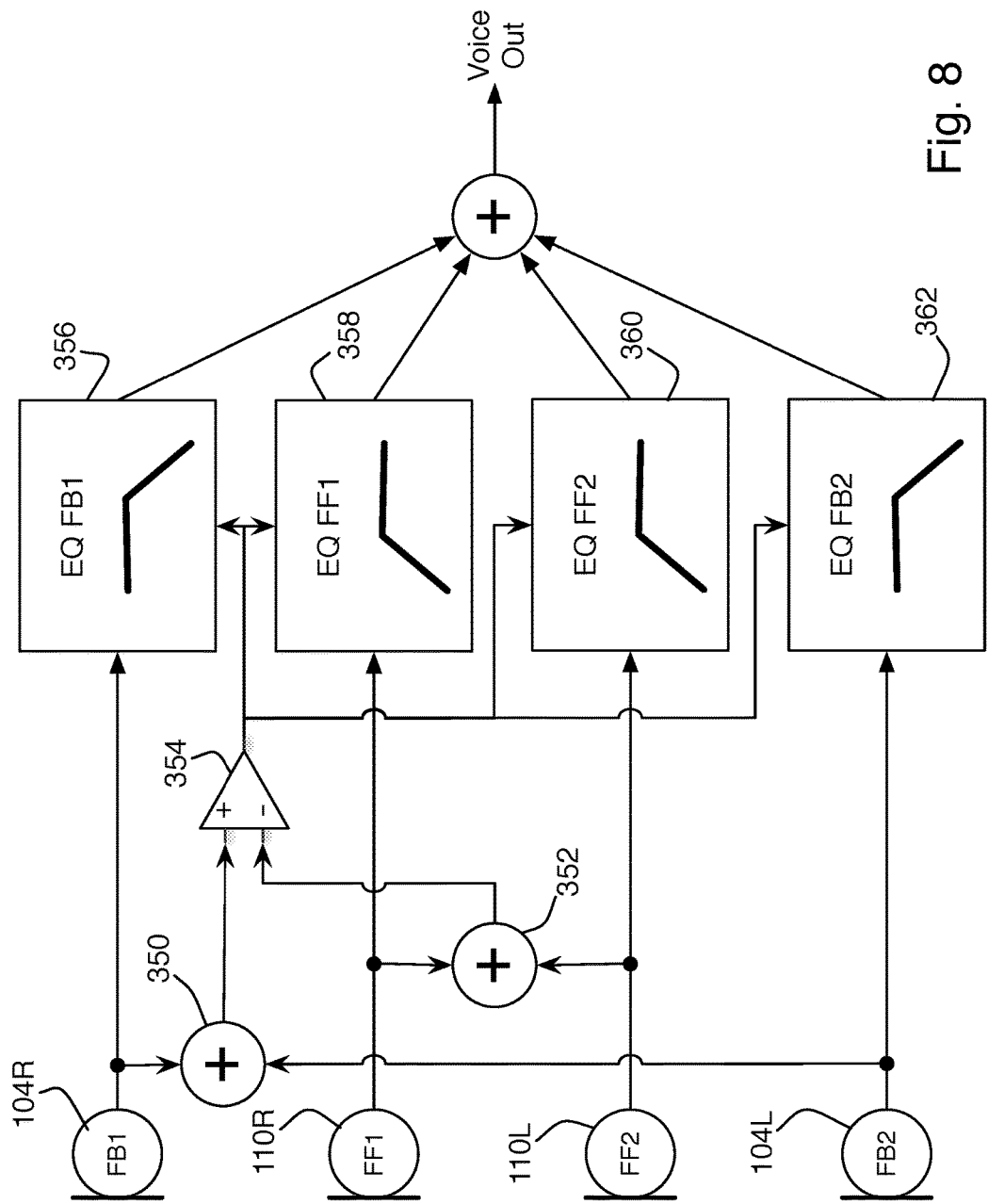

In another example, as shown in FIG. 8, further improvement in speech-to-ambient SNR and speech naturalness can be had by dynamically using the relative level at the feedback and feed-forward microphones to detect when the wearer is making certain types of speech sounds. This can be used to gate the feedback and feed-forward voice signal paths on and off or, more generally, change the equalization applied on a frame-by-frame (approximating a phoneme by phoneme) basis in order to achieve a more natural-sounding result. Essentially, this provides a robust voice activity detector (VAD). In the example topology of FIG. 8, the two feedback signals are combined 350, the two feed-forward signals are combined 352, and the two combined signals are compared 354. The results of the comparison are provided to the equalizers 356, 358, 360, 362, with the control input from the comparison 354 switching different equalizers on or off, or changing their equalization properties. This technique can be combined with any of the other signal flow topologies above; the topology of FIG. 3 is used for reference only.

The determination of the current speech sound may be done based on broad-band level or, preferably, by looking at portion(s) of the spectrum. For example, a high signal level from 150-500 Hz at the feedback microphone relative to the feed-forward microphone means a voiced sound is being made, and the feedback microphones should be used, possibly with some small contribution from the feed-forward microphones. Conversely, a high signal level above 500 Hz at the feed-forward microphones relative to the feedback microphones corresponds to an unvoiced sound, and the feed-forward microphone signal is preferred. Comparing feedback with feed-forward microphone signals, rather than simply looking at the raw signals, prevents speech processing from triggering when residual external sound leaks into the ear canal, reaching the feedback microphone.

In some examples, activation or modification of the different equalization paths is extended to the frequency domain, with a binary masking approach being used to modify each of the microphone signals on a frequency bin-by-bin basis based on a predetermined relative magnitude/phase relationship representative of typical human speech when the headset is worn. See, for example, U.S. Pat. No. 8,218,783, by Katzer and Hartung, U.S. Pat. No. 8,611,554, by Short and Walters, and U.S. Pat. No. 8,767,975, by Short, all incorporated here by reference.

The system described above can also be used to improve bandwidth extension processing of the near-field voice signal. By "bandwidth extension," we refer to artificially extending the bandwidth of a voice signal, by synthesizing sounds in bands where there is no signal or inadequate SNR to get a good signal. Using both occluded and free-air sensors provides discrimination of voiced and unvoiced speech. Those inputs are then combined to produce bandwidth extension models that are more effective than the state of the art. In addition, a combination of other sensor types, such as accelerometers, may also yield more effective bandwidth extension models. Although the voice signal at the feedback microphone is of high voice SNR due to ANR and the occlusion effect, it lacks higher-frequency voice content. By artificially extending the bandwidth of voice received by the feedback microphone, a full-band, high SNR approximation of voice content can be created. Methods of bandwidth extension known in the art include harmonic extension, linear prediction, envelope estimation, and feature mapping. These and other methods can be extended by also using signals from the full-band, lower-SNR feed-forward microphone. In one example, harmonics are added to the feedback microphone signal such that the mean squared error in the higher-frequency spectrum between the feed-forward and feedback microphones is minimized. In a second example, an a-priori model of bandwidth extension is chosen from a codebook to minimize error between the bandwidth-extended higher-frequency speech envelope of the feedback microphone signal versus that of the feed-forward microphone signal. In a third example, speech is characterized as either voiced or unvoiced by comparing the relative speech energy between the feed-forward and feedback microphones, which then determines if a bandwidth extension model should be applied to the feedback microphone signal (in the case of unvoiced speech) or not (in the case of voiced speech). In all of the above examples, use of the feed-forward microphone may be limited to instances where voice is present as detected by a voice activity detector.

With improved bandwidth extension models, the extended bandwidth can sound more realistic and/or cover a greater bandwidth. There are several benefits in applying bandwidth extension to near-field voice reception. Higher frequency voice content may be very hard to capture in earbud-mounted feed-forward microphones, at least with a high SNR, due to directivity of the mouth and the microphones. While that results in either a limiting of voice bandwidth or introduction of a low-SNR signal at higher frequencies, the signal can still be used to improve bandwidth extension into those frequencies. First, a low-pass filter is applied to the entire signal, then a synthesized signal as discussed above is introduced at higher frequencies. The synthesized signal has a higher SNR than the original high-frequency signals and can be equalized to produce a pleasing spectrum. In some examples, the measured signal and a bandwidth-extended signal are selectively mixed to aid speech intelligibility. Bandwidth extension is also useful in lower frequencies if microphone SNR is poor, for example if the talker is in the presence of significant low-frequency noise that masks lower-frequency speech content.

As mentioned, the earbuds 102 in FIGS. 1A, 1B, and 2 include an ear tip 114 which seals the acoustic structure 106 to the ear canal 108. This improves the noise reduction capabilities of the headphones by passively preventing exterior sound from entering the ear canal, but it also leads to the occlusion effect. This results from both the blocking of air-conducted sounds from the mouth, around the head, and into the ear, and the trapping of body-conducted sounds from the larynx into the ear canal. Some of the energy of body-conducted sounds is normally lost as the sound exits the ear through the ear canal. Trapping the body conducted sound, which tends to be at the lower-frequency end of the voice spectrum, inside the ear canal provides a bass boost to the user's voice. Meanwhile, the air-conducted sound tends to be at the higher frequency range, so blocking that path cuts the higher end of the user's voice, further distorting how the user hears his own voice. This is the source of the difference in signal content between the feedback and feed-forward microphones, used above to reconstruct the voice signal, but it also causes the user's voice to sound unnatural to the user himself.

If desired, the feed-forward signal path filters can be adjusted to allow the user's voice to pass through the feed-forward noise cancellation path, so that the user still hears the air-conducted portion of his voice. Similarly, the feedback path can also be altered, to reduce those parts of the user's voice that are amplified within the ear canal when the entrance to the ear canal is plugged by the headphone, so that the total voice sound detected by the eardrum sounds correct. Such techniques are described in U.S. Pat. No. 8,798,283, by Gauger et al., incorporated here by reference.

Adjusting the noise cancellation paths to allow the user to hear his own voice may be sufficient, depending on the capabilities of the ANR circuitry, to provide natural-sounding self-voice for the user. The residual voice signal in the ear canal, as detected by the feedback microphone, can also be used as an output voice signal for use in communications, as a supplement to or in place of the techniques described above. When a far-end user's voice is reproduced by the headphone's speaker, it is detected by the feedback microphone, and would be sent back to the far-end user as if it were the local user's voice, so an echo is possible at the far end, but this can be resolved using conventional echo cancellation techniques to remove the far-end signal from the near-end voice signal based on the known transfer function of the in-ear system.

In some cases, it has been found that adjusting the feedback path to cancel the effects of occlusion, while providing feed-forward noise cancellation of ambient sounds, can provide a natural self-voice experience. The partial cancelation of the body-conducted voice, provided by the feedback noise reduction, improves self-voice perception enough that the loss of higher-frequency air-conducted voice components due to the feed-forward noise reduction is not distracting, leaving a pleasing residual voice signal in the ear canal, without unwanted outside noise. It happens that this residual voice signal, detected by the feedback microphone, is also good for outbound voice communication, especially when supplemented by the higher-frequency voice components detected by the feed-forward microphones.

Figure 9:
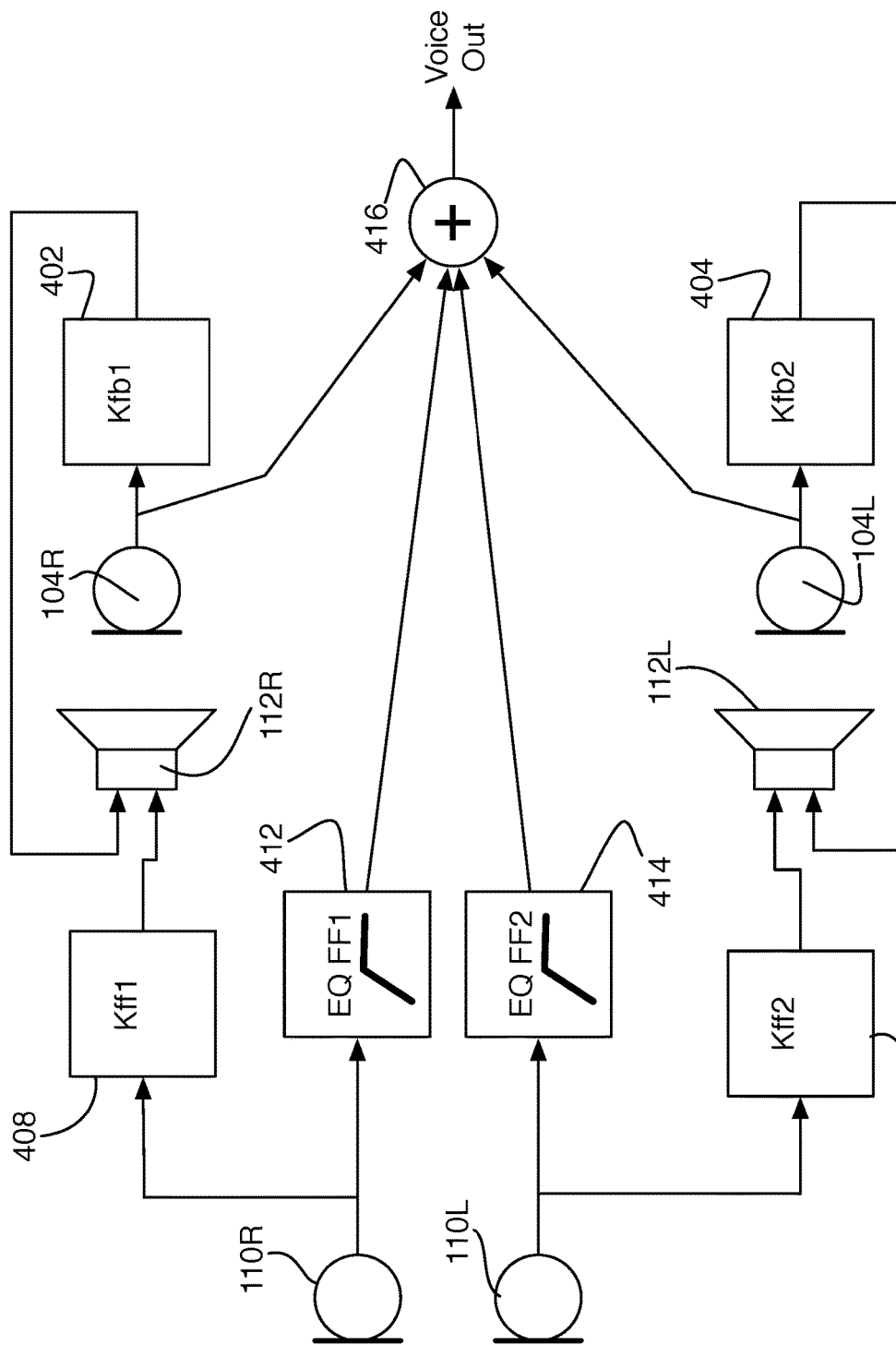

A system providing both of these features is shown in FIG. 9. The feedback microphones 104R and 104L provide an input to corresponding feedback compensation filters 402 and 404, which provide a feedback antinoise signal to the output drivers 112R and 112L. The feed-forward microphones 110R and 110L provide input to the feed-forward filters 408 and 410, which provide feed-forward antinoise to the output drivers (this is the same system that would be used to provide noise cancellation for the user in each of the systems shown above). The two types of antinoise may be summed at different points in the system topology, and combined with incoming voice signals (not shown), as described in U.S. Pat. No. 8,073,150, by Joho and Carreras, incorporated here by reference. The connection to the driver is merely representative of the ultimate signal flow.

The feed-forward microphone signals are also filtered by filters 412 and 414 to provide the components of air-conducted voice that are missing from the residual voice detected by the feedback microphones. These filtered feed-forward signals are combined with the signals from the feedback microphones at the summation node 416. This configuration can be combined with the various topologies described above, e.g., corresponding microphones may be summed before being filtered, and only a single feed-forward and/or feedback filter used for both ears and/or for the outbound voice. In some examples, the feed-forward microphone signals can be used during moments of quiet to adaptively tune the feedback loop to better capture the user's voice with the feedback microphones.

Figure 10:
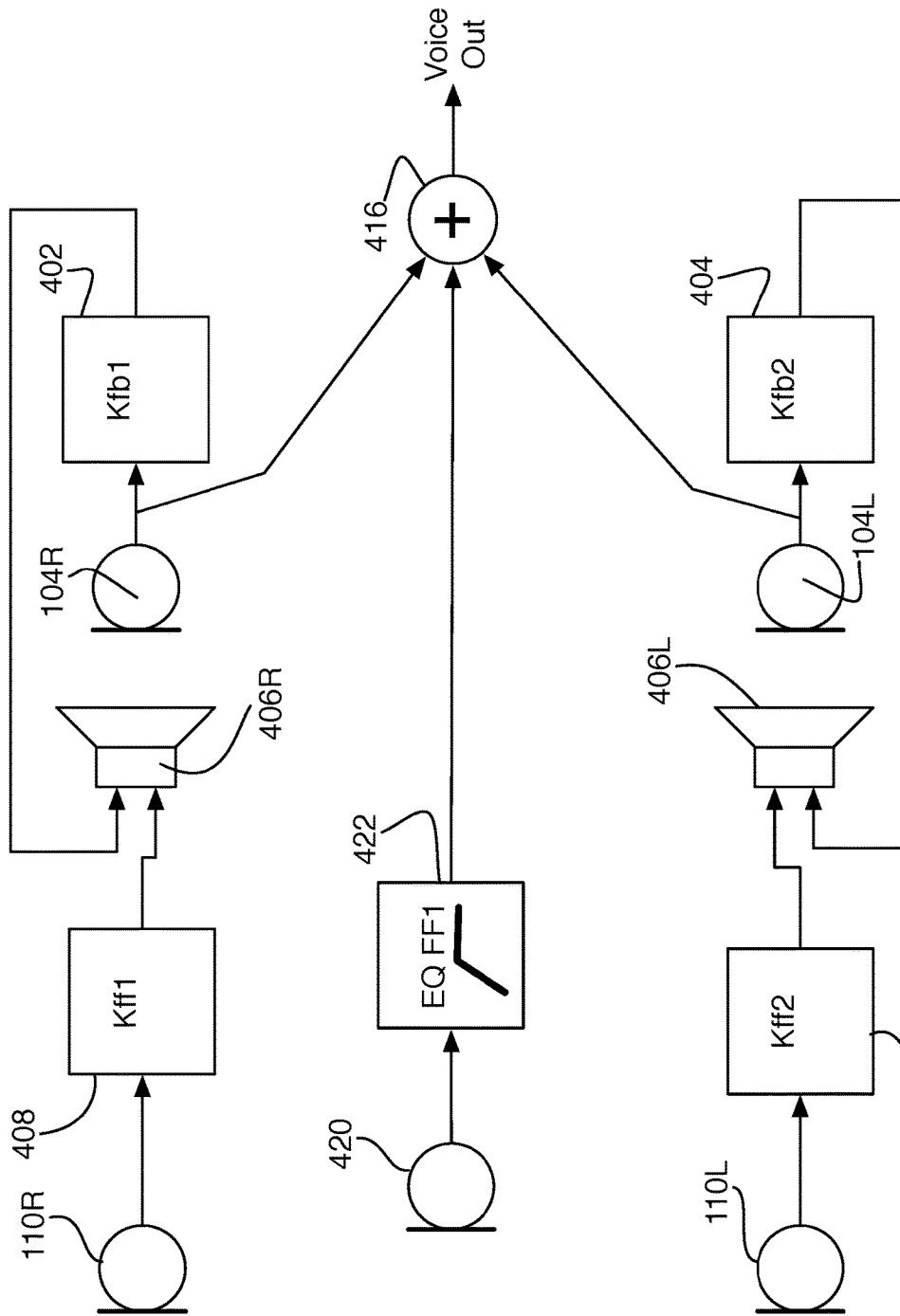

In other examples, as shown in FIG. 10, this method of using the feedback microphone as a primary microphone for outbound voice is combined with a conventional, directional voice microphone 420, instead of the omnidirectional feed-forward noise-cancellation microphones 110R, 110L, to provide the missing high-frequency content of the user's voice without picking up surrounding noise. The voice filter 422 may be the same as the filter 412 used when the feed-forward microphones provide the voice content, or it may be slightly different.

Figure 11:
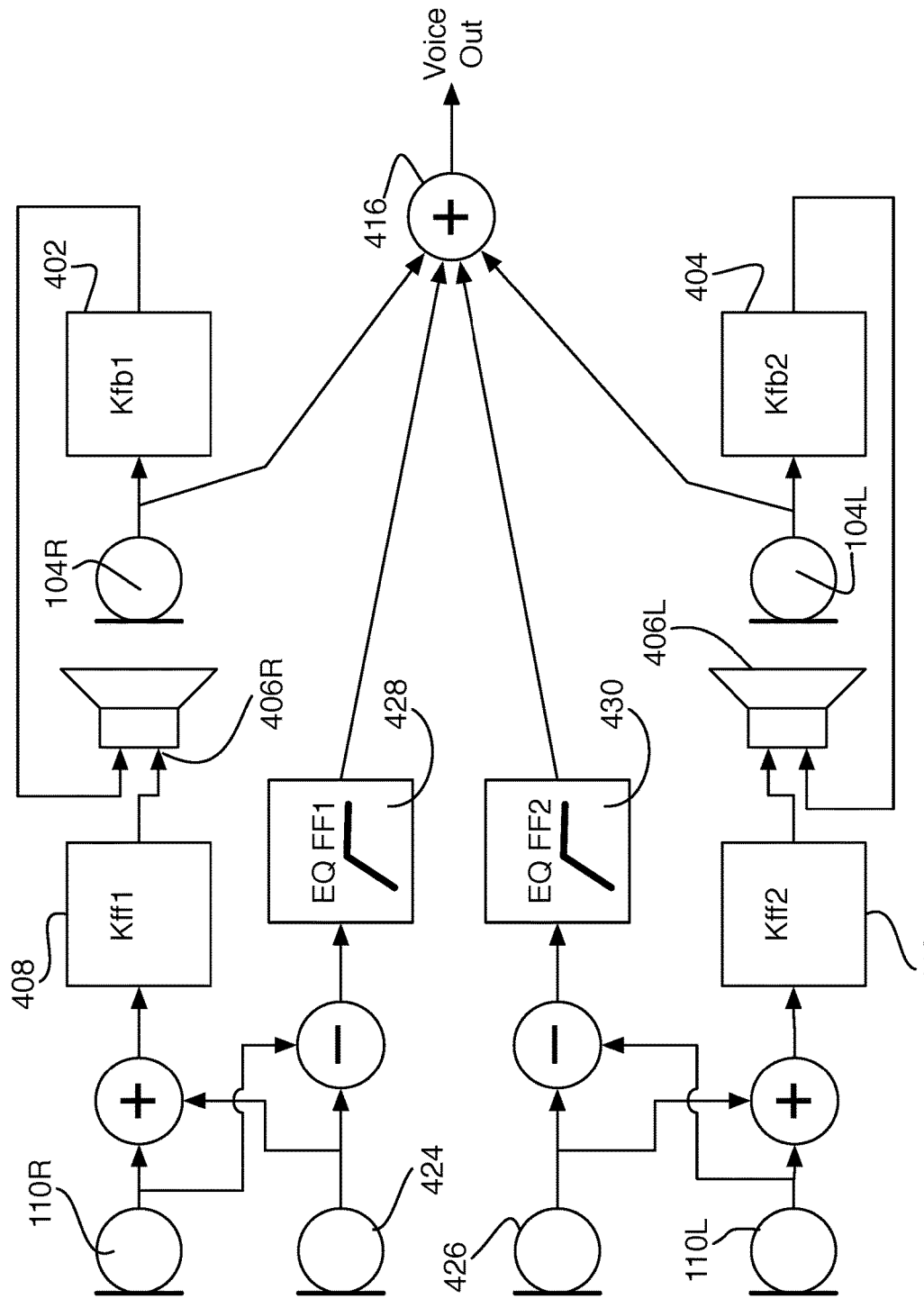

In yet another example, as shown in FIG. 11, a second omnidirectional microphone 424 is added to at least one side, and the pair of feed-forward microphones on that (or each) side are summed to produce an input for the antinoise filter 408, and subtracted from each other to form a two-microphone directional array to provide input to the voice filter 428 to isolate the desired voice content. The same arrangement may be repeated on the other side, with a fourth omnidirectional microphone 426 being summed with the left feed-forward microphone 110L as input to the left feed-forward filter 410 and subtracted to create a directional microphone input to the second voice filter 430.

Embodiments of the systems and methods described above may comprise computer components and computer-implemented steps that will be apparent to those skilled in the art. For example, it should be understood by one of skill in the art that the signal-processor-implemented steps may be stored as computer-executable instructions on a computer-readable medium such as, for example, floppy disks, hard disks, optical disks, Flash ROMS, nonvolatile ROM, and RAM. Furthermore, it should be understood by one of skill in the art that the signal-processor-executable instructions may be executed on a variety of processors such as, for example, microprocessors, digital signal processors, gate arrays, etc. For ease of exposition, not every step or element of the systems and methods described above is described herein as part of a computerized system, but those skilled in the art will recognize that each step or element may have a corresponding computer system or software component. Such computer system and/or software components are therefore enabled by describing their corresponding steps or elements (that is, their functionality), and are within the scope of the disclosure.

A number of implementations have been described. Nevertheless, it will be understood that additional modifications may be made without departing from the scope of the inventive concepts described herein, and, accordingly, other embodiments are within the scope of the following claims.

What is claimed is:

1. An in-ear noise cancelling headset comprising:
   an earpiece comprising a feedback microphone (104) and an output driver (112);
   a feedback loop receiving a first signal from the feedback microphone and providing an antinoise signal, based on the first signal, to the output driver,
      the feedback loop including a feedback compensation filter (402, 404) that receives the first signal and produces the antinoise signal,
      wherein, at frequencies at which voice sounds produced by the wearer of the headset tend to be amplified within an occluded ear canal, the feedback compensation filter produces antinoise at levels selected to counteract such amplification without otherwise cancelling the voice sounds;
   a voice output circuit receiving the first signal from the feedback microphone,
      the voice output circuit including a voice output filter that receives the first signal and produces a voice-filtered signal; and
   a communications interface providing the voice-filtered signal as a voice communication signal output from the headset.

2. The headset of claim 1, further comprising:
   a feed-forward microphone (110) coupled to space outside the earpiece;
   a feed-forward loop receiving a second signal from the feed-forward microphone and providing a second antinoise signal based on the second signal to the output driver, via a feed-forward compensation filter (408, 410); and
   a voice circuit receiving the voice-filtered signal and the second signal, applying a filter (412, 414) to the second signal, and combining (416) the filtered second signal with the first signal to generate the voice communication signal.

3. The headset of claim 1, further comprising:
a feed-forward microphone (110) coupled to space outside the earpiece;
a voice microphone (420), separate from the feed-forward microphone, coupled to space outside the earpiece;
a feed-forward loop receiving a second signal from the feed-forward microphone and providing a second antinoise signal based on the second signal to the output driver, via a feed-forward compensation filter (408, 410); and
a voice circuit receiving the first signal and a third signal from the voice microphone, applying a filter (422) to the third signal, and combining (416) the filtered third signal with the voice-filtered signal to generate the voice communication signal.

4. The headset of claim 1, further comprising:
a first feed-forward microphone (110) coupled to space outside the earpiece;
a second feed-forward microphone (424) coupled to space outside the earpiece;
a feed-forward loop receiving a sum of a second signal from the first feed-forward microphone and a third signal from the second feed-forward microphone, and providing a second antinoise signal based on the sum to the output driver, via a feed-forward compensation filter (408); and
a voice circuit receiving a difference of the second signal and the third signal, applying a filter (428) to the difference, and combining (416) the filtered difference signal with the voice-filtered signal to generate the voice communication signal.

5. A method of generating a voice communication signal in an in-ear noise cancelling headset comprising a feedback microphone and an output driver, the method comprising:
receiving a first signal from the feedback microphone;
filtering the first signal to produce an antinoise signal, wherein, at frequencies at which voice sounds produced by the wearer of the headset tend to be amplified within an occluded ear canal, the antinoise is produced at levels selected to counteract such amplification without otherwise cancelling the voice sounds;
reproducing the antinoise signal within the headset via the output driver,
filtering the first signal to produce a voice-filtered signal; and
providing the voice-filtered signal as the voice communication signal output from the headset.

6. The method of claim 5, further comprising:
receiving a second signal from a feed-forward microphone coupled to space outside the headset,
filtering the second signal to produce a second antinoise signal,
reproducing the second antinoise signal within the headset via the output driver simultaneously with the first antinoise signal,
filtering the second signal to produce a partial voice signal, and
combining the partial voice signal with the voice-filtered signal to generate the voice communication signal for output.

7. The method of claim 5, further comprising:
receiving a second signal from a feed-forward microphone coupled to space outside the headset,
receiving a third signal from a voice microphone, separate from the feed-forward microphone, coupled to space outside the headset,
filtering the second signal to produce a second antinoise signal,
reproducing the second antinoise signal within the headset via the output driver simultaneously with the first antinoise signal,
filtering the third signal to produce a partial voice signal, and
combining the partial voice signal with the voice-filtered signal to generate the voice communication signal for output.

8. The method of claim 5, further comprising:
receiving a second signal from a feed-forward microphone coupled to space outside the headset,
receiving a third signal from a second feed-forward microphone coupled to space outside the headset,
summing the second signal with the third signal and filtering the sum to produce a second antinoise signal,
reproducing the second antinoise signal within the headset via the output driver simultaneously with the first antinoise signal,
subtracting the third signal from the second signal and filtering the difference to produce a partial voice signal, and
combining the partial voice signal with the voice-filtered signal to generate the voice communication signal for output.

* * * * *